United States Patent
Osawa

(10) Patent No.: US 9,886,627 B2
(45) Date of Patent: Feb. 6, 2018

(54) DOCUMENT ANALYSIS SERVER FOR RECOMMENDING A STORAGE DESTINATION OF IMAGE DATA TO AN IMAGE PROCESSING APPARATUS

(71) Applicant: CANON KABUSHIKI KAISHA, Tokyo (JP)

(72) Inventor: Takaharu Osawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/008,572

(22) Filed: Jan. 28, 2016

(65) Prior Publication Data

US 2016/0227069 A1 Aug. 4, 2016

(30) Foreign Application Priority Data

Jan. 30, 2015 (JP) .................................. 2015-017891

(51) Int. Cl.
*G06K 9/00* (2006.01)
*G06F 17/30* (2006.01)

(52) U.S. Cl.
CPC .... *G06K 9/00442* (2013.01); *G06F 17/30011* (2013.01)

(58) Field of Classification Search
CPC ... H04N 1/00225; G06F 19/32; G06F 19/321; G06K 9/00442
See application file for complete search history.

(56) References Cited

U.S. PATENT DOCUMENTS

| | | | | |
|---|---|---|---|---|
| 8,473,454 B2 * | 6/2013 | Evanitsky | ............. | G06Q 10/10 707/608 |
| 2002/0102012 A1 * | 8/2002 | Keller | ............. | G06F 17/30265 382/128 |
| 2003/0061221 A1 | 3/2003 | Ito | | |
| 2004/0105599 A1 * | 6/2004 | Siddle | ............. | H04N 1/32771 382/317 |
| 2006/0224686 A1 * | 10/2006 | Kitada | ............. | G06Q 10/06 709/209 |
| 2007/0033516 A1 * | 2/2007 | Khosla | ............. | H04L 67/26 715/205 |
| 2008/0056575 A1 * | 3/2008 | Behm | ............. | G06F 17/30707 382/180 |
| 2010/0002271 A1 * | 1/2010 | Yamada | ............. | H04N 1/00217 358/448 |
| 2010/0042523 A1 * | 2/2010 | Henry | ............. | G06Q 10/10 705/34 |
| 2010/0262652 A1 * | 10/2010 | Soga | ............. | H04N 1/00204 709/203 |
| 2011/0026064 A1 * | 2/2011 | Kato | ............. | H04N 1/442 358/1.14 |
| 2012/0233537 A1 * | 9/2012 | Kawabata | ............. | H04N 1/00408 715/234 |

(Continued)

FOREIGN PATENT DOCUMENTS

JP 2006229305 A 8/2006
JP 2008301476 A 12/2008

*Primary Examiner* — Benjamin O Dulaney
(74) *Attorney, Agent, or Firm* — Canon U.S.A., Inc. IP Division

(57) ABSTRACT

A document analysis apparatus receives image data divided for each page, sequentially analyzes the received image data page-by-page, and returns, when determining that a storage destination candidate of the image data is determined, the determined storage destination candidate.

4 Claims, 12 Drawing Sheets

(56) References Cited

U.S. PATENT DOCUMENTS

| | | |
|---|---|---|
| 2014/0002863 A1 | 1/2014 | Hasegawa |
| 2014/0222762 A1* | 8/2014 | Fallon ................ H04N 1/32101 |
| | | 707/665 |
| 2016/0119506 A1* | 4/2016 | Namihira ................ H04N 1/64 |
| | | 358/426.01 |
| 2016/0321018 A1* | 11/2016 | Okabe ...................... H04N 1/10 |
| 2016/0366299 A1* | 12/2016 | Sato ................... H04N 1/32427 |

* cited by examiner

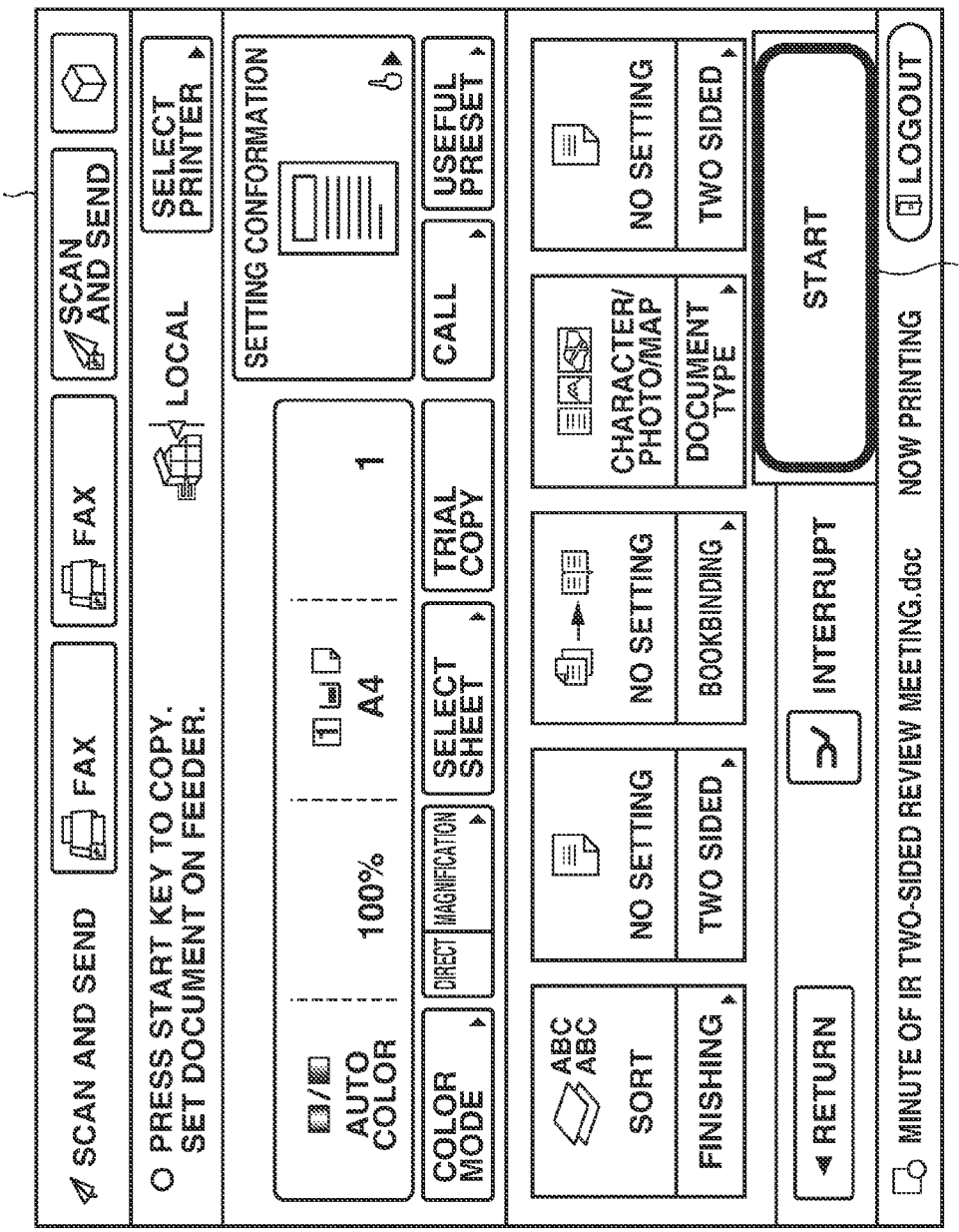

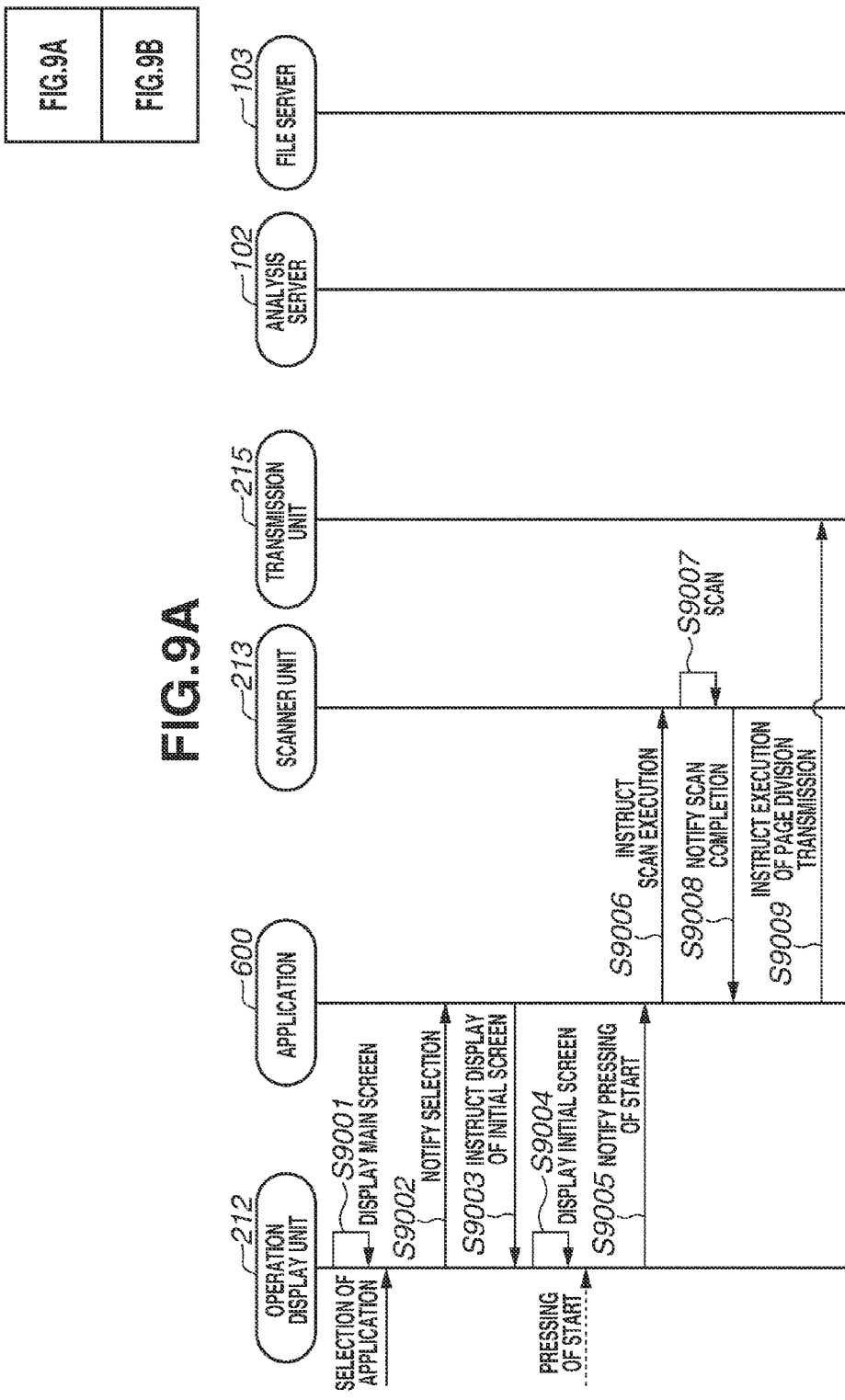

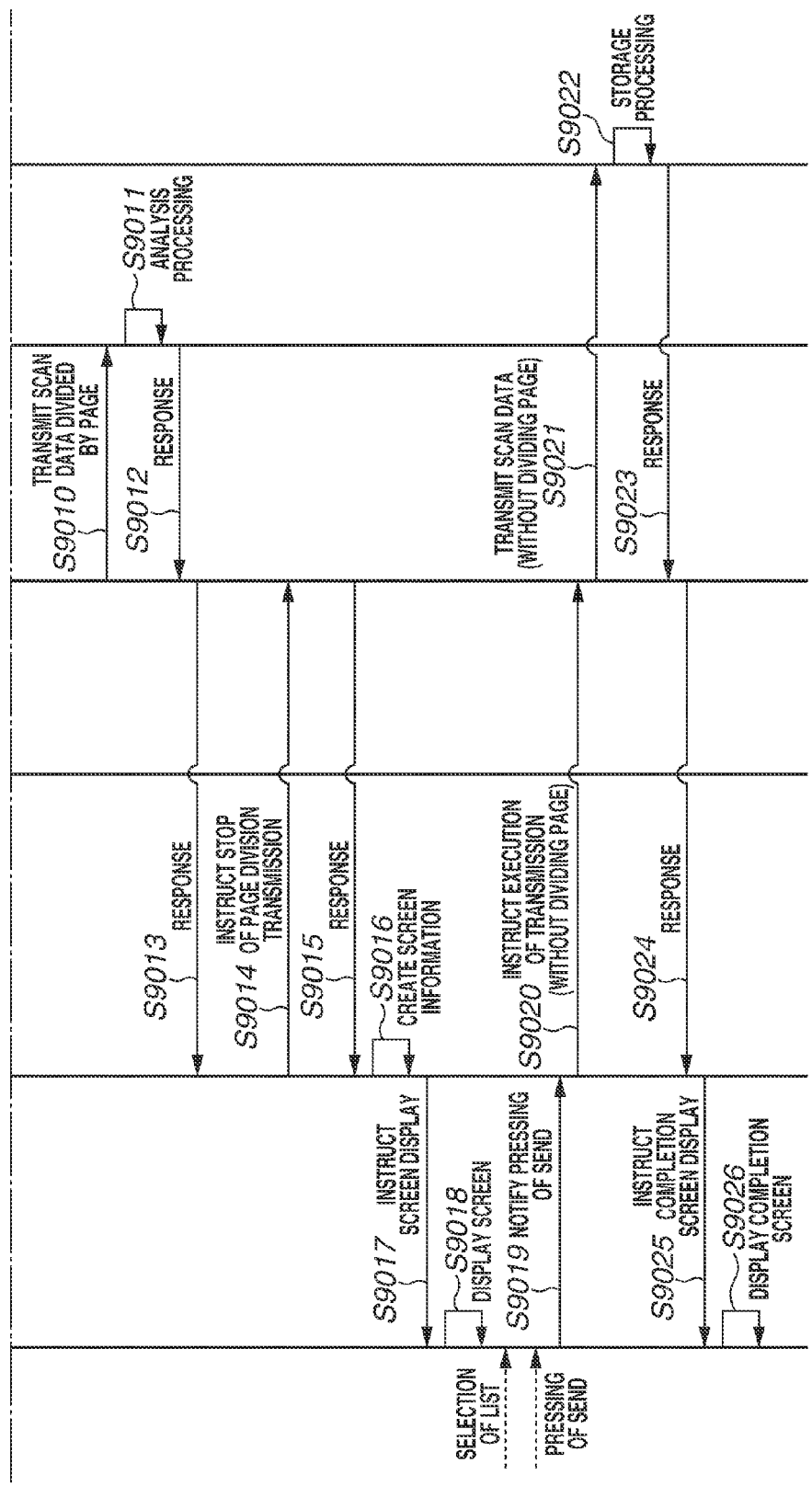

DOCUMENT ANALYSIS SERVER FOR RECOMMENDING A STORAGE DESTINATION OF IMAGE DATA TO AN IMAGE PROCESSING APPARATUS

BACKGROUND

Field

Aspects of the present invention generally relate to a document analysis system, a document analysis apparatus, and a document analysis method for analyzing a document and presenting a storage destination candidate of the document and a storage medium.

Description of the Related Art

Recently, fields such as law farms which handle a large amount of paper documents use multifunction. peripherals including scanners and scanning functions to classify and store electronic documents obtained by scanning paper documents in related storage destinations. Regarding storage destinations of electronic data of paper documents obtained by scanning, methods have been discussed. in which operators select the storage destinations by manually specifying and/or using histories storage destinations used in the past and bookmarks registered in advance.

U.S. Patent Application Publication No. 201/0002863 discusses a method for printing information for specifying a storage destination in advance on a paper document as a scanning target using a bar code and the like, reading the information at the time of scanning, and storing a scanned image in the specified storage destination.

U.S. Patent Application Publication No. 2003/0061221 discusses a technique for analyzing a text included in a document to search. for folders appropriate for the document and storing the document in a folder selected by a user from among the searched storage destination. candidates. More specifically, a feature of the text included in the document is compared with an average of features of documents stored in the folder to enumerate storage destination candidates appropriate for storage destinations.

On the other hand, there are following issues in a system in which an image processing apparatus (or a scanner) transmits electronic data of a scanned document to an analysis server, and the analysis server searches storage destination candidates by analyzing the received electronic data of the document. When a scanned document includes many pages, it takes a long time to transmit. electronic data from the image processing apparatus to the analysis server. Further, when the electronic data of the document includes many pages, it takes a long time for analysis processing of the electronic data, and it also takes a long time to present storage destination candidates appropriate for the document to a user.

SUMMARY

According to an aspect of the present invention, a document analysis system includes an image processing apparatus and an analysis server. The image processing apparatus includes a first transmission. unit configured to divide image data obtained by scanning a document including a plurality of pages for each page and transmit the divided image data to the analysis server, a reception unit configured to receive a storage destination candidate of the image data from the analysis server, a selection unit configured to present the storage destination candidate received by the reception unit and enable selection of a storage destination, and a second transmission unit configured to transmit the image data obtained by scanning the document including the plurality of pages as one file to the storage destination selected by the selection unit so as to be stored therein. The analysis server includes an analysis unit configured to sequentially analyze, page-by-page, the image data transmitted from the first transmission unit, and a reply unit configured to, when the analysis unit determines a storage destination candidate of the image data, return the determined storage destination candidate of the image data to the image processing apparatus.

Further features of aspects of the present invention will become apparent from the following description of exemplary embodiments with reference to the attached drawings.

BRIEF DESCRIPTION OF THE DRAWINGS

FIG. 8 illustrates an example of an application. screen displayed by the operation display unit 212.

FIG. 9 (including FIGS. 9A and 9B) is a sequence diagram of the document analysis system according to an aspect of the present invention.

DESCRIPTION OF THE EMBODIMENTS

Figure 1:
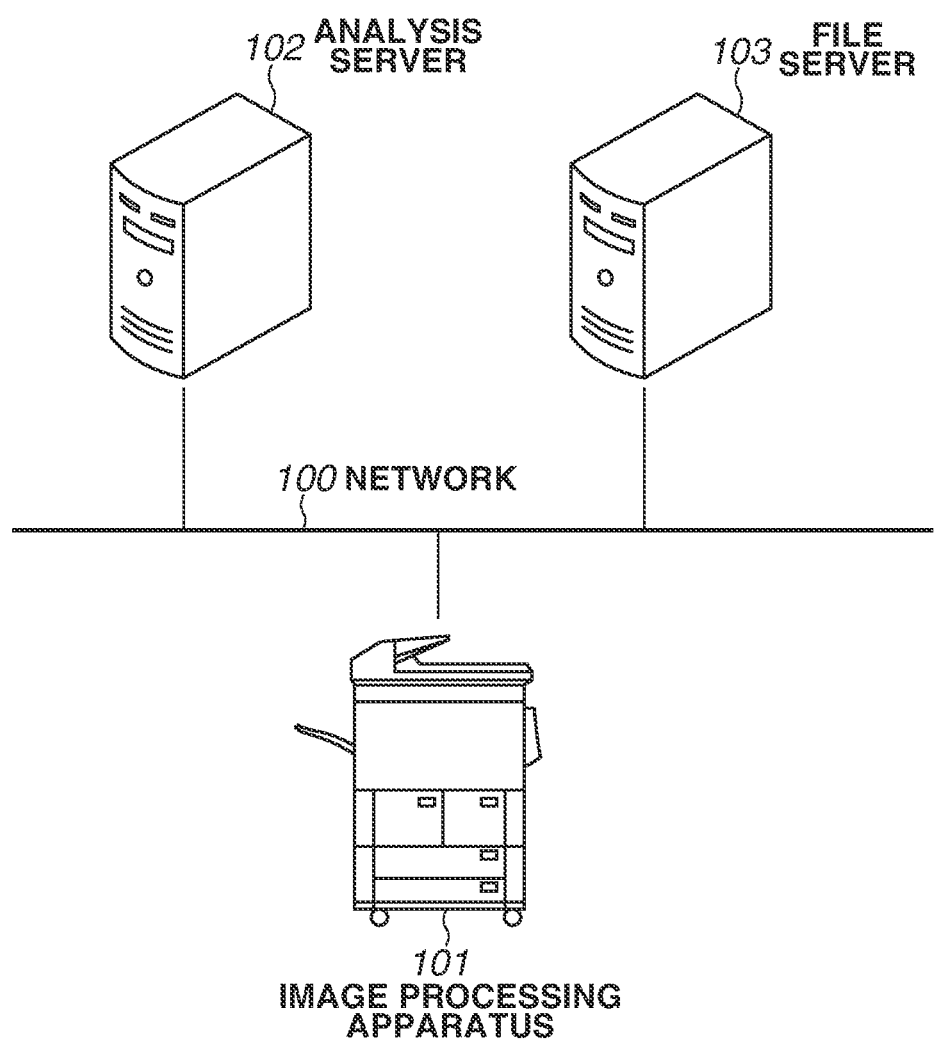
FIG. 1 illustrates an example of a configuration of a document analysis system according to an aspect of the present invention.

FIG. 1 illustrates an example of a configuration of a document analysis system. The document analysis system includes an image processing apparatus (a scanner or a multifunction peripheral including a scanner unit) 101, an analysis server (a document analysis apparatus) 102, and a file server 103 which are connected with each other via a network 100. The network 100 is a basis for each apparatus to communicate with each other and may be an intranet, the Internet, and other network systems.

The analysis server 102 has a function of obtaining a file stored in a plurality of folders (a plurality of storage destinations) in the file server 103, extracting a text from the file, and storing the extracted text in a database (DB). In other words, the analysis server extracts and stores text information of a file stored in each of a plurality of storage destinations as feature information of each storage destination. When data to be classified is received from the image processing apparatus, the analysis server analyzes the received data to extract a text, compares the extracted text with the feature information of each storage destination stored in the DB, and returns a storage destination storing a file similar to the received data as a storage destination candidate.

The image processing apparatus 101 transmits image data obtained by scanning a document to the analysis server 102 and obtains information of the storage destination candidates from the analysis server. Then, the image processing apparatus 101 stores the image data in a storage destination, selected from among the storage destination candidates based on a user instruction. The file server 103 has a function of storing a file of image data and the like transmitted from the image processing apparatus in a folder in the storage destination specified by the image processing apparatus.

Figure 2:
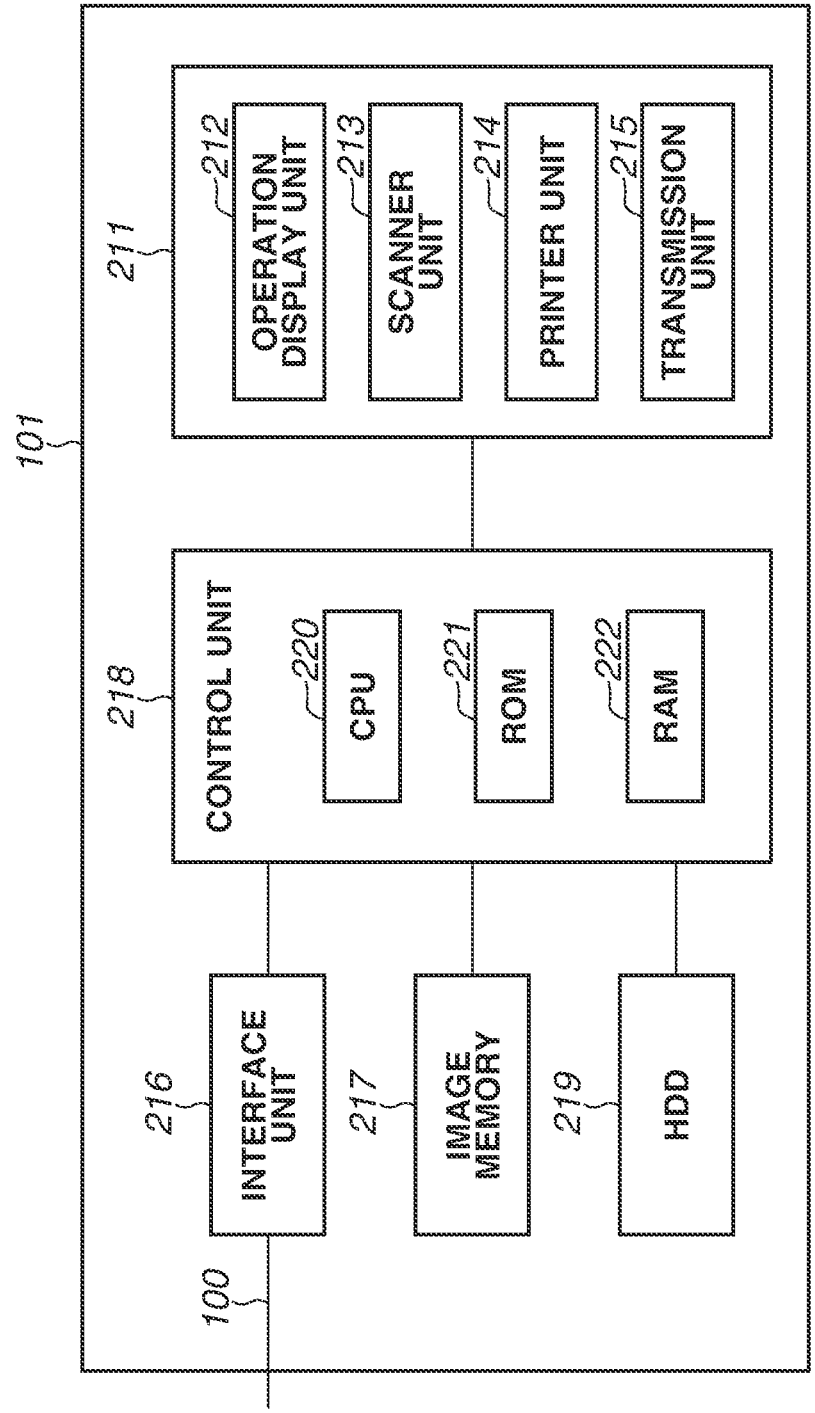
FIG. 2 illustrates an example of a hardware configuration of an image processing apparatus 101.

FIG. 2 is a block diagram illustrating a hardware configuration of the image processing apparatus 101. In FIG. 2, a control unit 218 includes a central processing unit (CPU) 220, a read-only memory (ROM) 221, and a random access memory (RAM) 222 and controls operations of the entire image processing apparatus 101. The CPU 220 reads and executes a control program stored in the ROM 221 to perform. various control processing such as reading control and transmission control. The RAM 222 is used as a main memory and a temporary storage area such as a work area of the CPU 220. The control unit 218 is connected to a function unit 211 and controls operations of the operation display unit 212, a scanner unit 213, a printer unit 214, and a transmission unit 215.

On the operation display unit 212, a liquid crystal display and the like having a touch panel function, a keyboard, and others are arranged. The operation display unit 212 displays an operation screen on the display. The scanner unit 213 reads a document (a paper document) to generate image data and outputs the image data to the control unit 218. The scanner unit 213 includes an auto document feeder (ADF). When scanning is instructed in a state in which a document including a plurality of sheets (a plurality of pages) is placed on the ADF, the scanner unit 213 automatically scans the document page-by-page in order and generates image data. The printer unit 214 prints the image data output from the control unit 218 on a sheet. The transmission unit 215 transmits the image data read and stored by the scanner unit 213 to a specified transmission destination.

An interface unit 216 is connected to the network 100 to receive image data to be printed and screen data to be displayed by the operation display unit from an external information processing apparatus (not illustrated). A hard disk drive (HDD) 219 is a storage apparatus for storing image data and various programs. Various programs regarding the present exemplary embodiment are stored in the HDD 219. The image data to be printed received from the external information processing apparatus is temporarily stored in an image memory 217 and printed by the printer unit 214 via the control unit 218.

Figure 3:
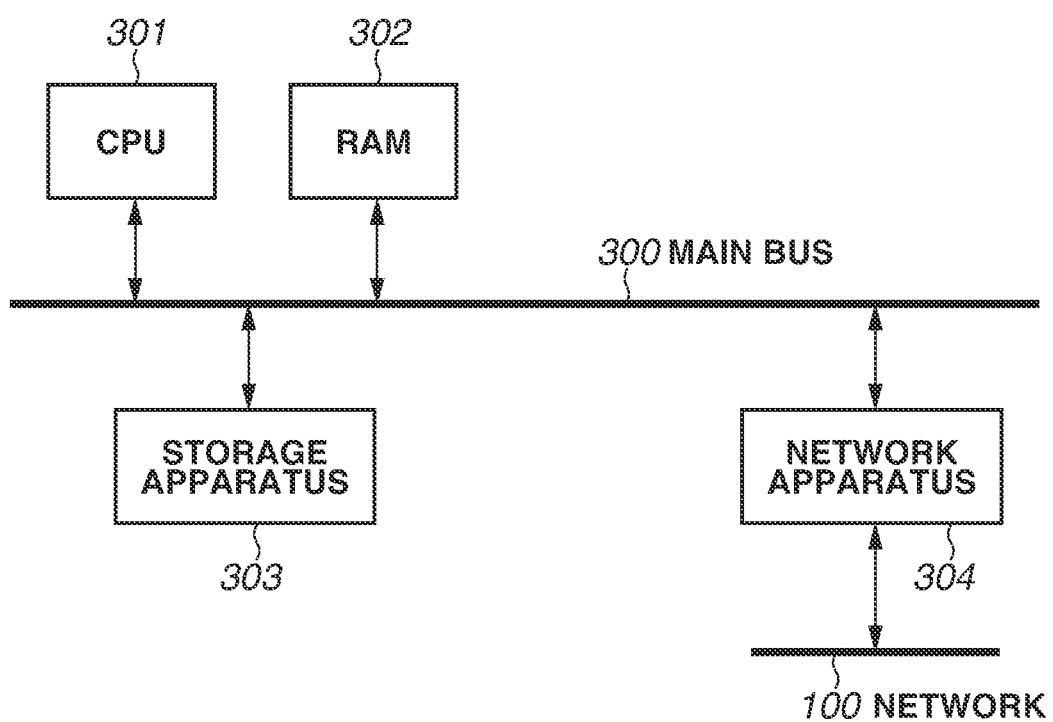
FIG. 3 illustrates an example of a hardware configuration of an analysis server 102 and a file server.

FIG. 3 illustrates an example of a hardware configuration of the analysis server 102 and the file server 103 according to the present exemplary embodiment. Each server includes a CPU 301, a RAM 302 providing a work area of the CPU 301, a storage apparatus 303 storing a computer program and a setting for implementing a function as the respective server, a network apparatus 304 for communicating with other apparatuses via the network 100, a main bus 300, and the like.

Figure 4:
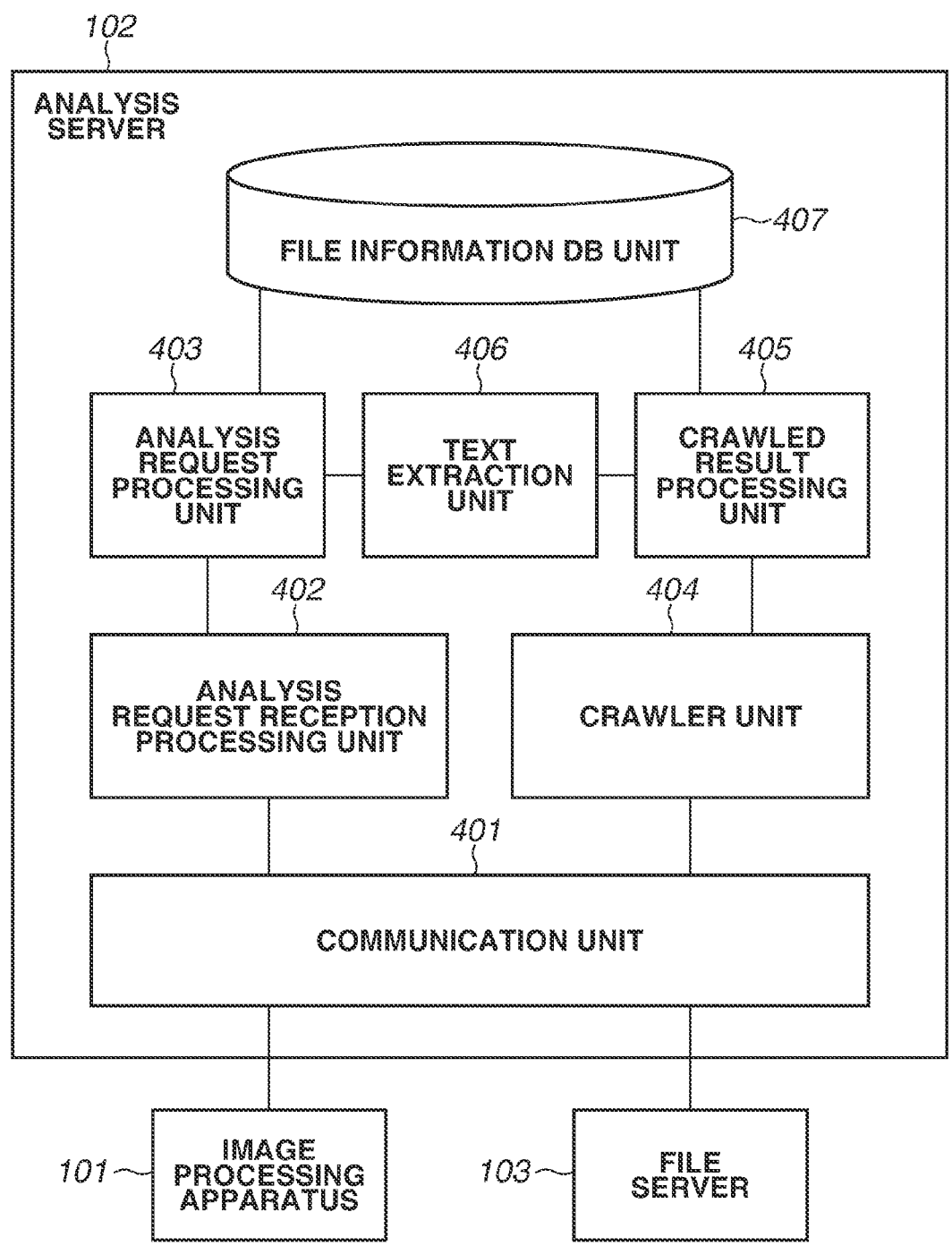
FIG. 4 illustrates an example of a software configuration of the analysis server 102.

FIG. 4 illustrates an example of a software configuration of the analysis server 102. The CPU of the analysis server 102 executes the computer program and thus functions as each of function units 401 to 407 illustrated in FIG. 4.

The analysis server 102 includes a communication unit 401, an analysis request reception processing unit 402, an analysis request processing unit 403, a crawler unit 404, a crawled result processing unit 405, a text extraction unit 406, and a file information DE unit 407.

The crawler unit 404 collects information of a file stored in the file server 103 (stored electronic data) and information of a storage destination (a folder) of the file via the communication unit 401. It is desirable that the crawler unit 404 collects a new file stored in the file server 103 or an updated file and does not collect a file of which information has been already collected in the past. The crawler unit 404 transmits the collected file and the storage destination information to the crawled result processing unit 405.

The crawled result processing unit 405 transmits the file received from the crawler unit 404 to the text extraction unit 406 and receives therefrom information of a text extracted from the file (a text extraction result) as a response. Then, the crawled result processing unit 405 stores storage destination information corresponding to the text extraction result received from the text extraction unit 406 as file information (feature information of the storage destination) in the file information DB unit 407.

On the other hand, when an analysis request of a scanned image is received from the image processing apparatus 101 via the communication unit 401, the analysis request reception processing unit 402 receives image data of the analysis target (image data obtained by scanning the document) from the image processing apparatus 101. The analysis request reception processing unit 402 also performs processing for transmitting a result (analysis result) of analyzing the image data by the analysis request processing unit 403, which is described below, to the image processing apparatus 101 as a response.

The analysis request processing unit 403 transmits the image data of the analysis target received by the analysis request reception processing unit 402 to the text extraction unit 406 and receives therefrom a text extracted by performing optical character recognition (OCR) processing on the image data (data of a character recognition result) as a response. Further, the analysis request processing unit 403 obtains the file information stored in the file information DB unit 407 and performs comparison processing for comparing the file information with the text data (the data of the character recognition result) received from the text extraction unit. The analysis request processing unit 103 specifies one or a plurality of storage destinations storing a file similar to the received image data of the analysis target based on the result of the comparison processing and transmits the specified storage destinations to the analysis request reception processing unit 402 as the storage destination candidates.

The text extraction unit 406 extracts text information from the scanned image data received from the image processing apparatus 101 by performing the OCR processing and the like and extracts text information from a file received from the file server. The text extraction unit 406 further performs processing for dividing the extracted text information into appropriate clauses and tallying the number of appearances of a keyword and the like.

Figure 5:
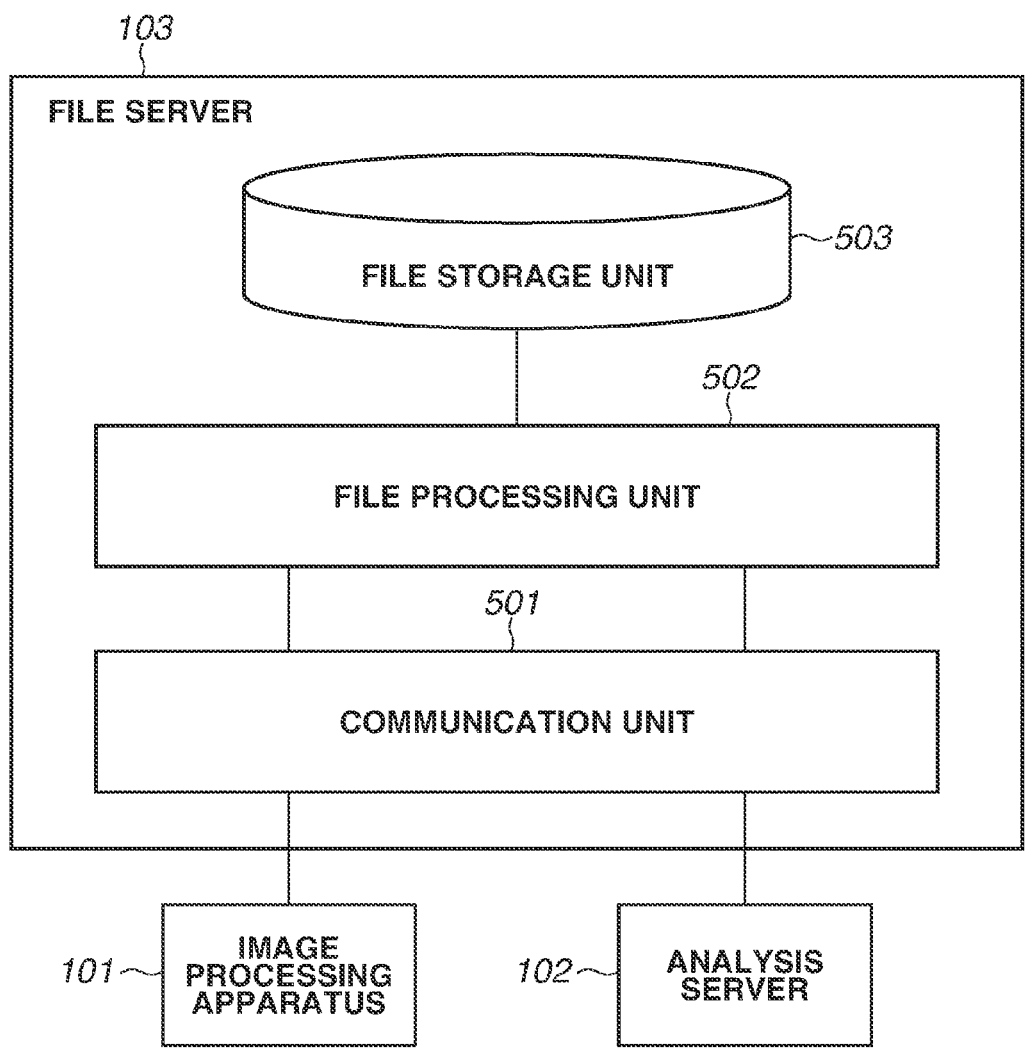
FIG. 5 illustrates an example of a software configuration of the file server 103.

FIG. 5 illustrates an example of a software configuration of the file server 103 according to the present exemplary embodiment. The CPU of the file server 103 executes the computer program and thus functions as each of function units (a communication unit 501, a file processing unit 502, and a file storage unit 503) illustrated in FIG. 5.

The file processing unit 502 receives a request from the image processing apparatus 101 and the analysis server 102 via the communication unit 501. Types of requests to be received may include a file storage request to the file storage unit 503 and an obtainment request of a file stored in the file storage unit. The file processing unit 502 stores and obtains a file in and from the file storage unit 503 in response to the received request. The file storage unit 503 serves a role for storing an entity of a file in a storage apparatus according to an instruction from the file processing unit.

Figure 6:
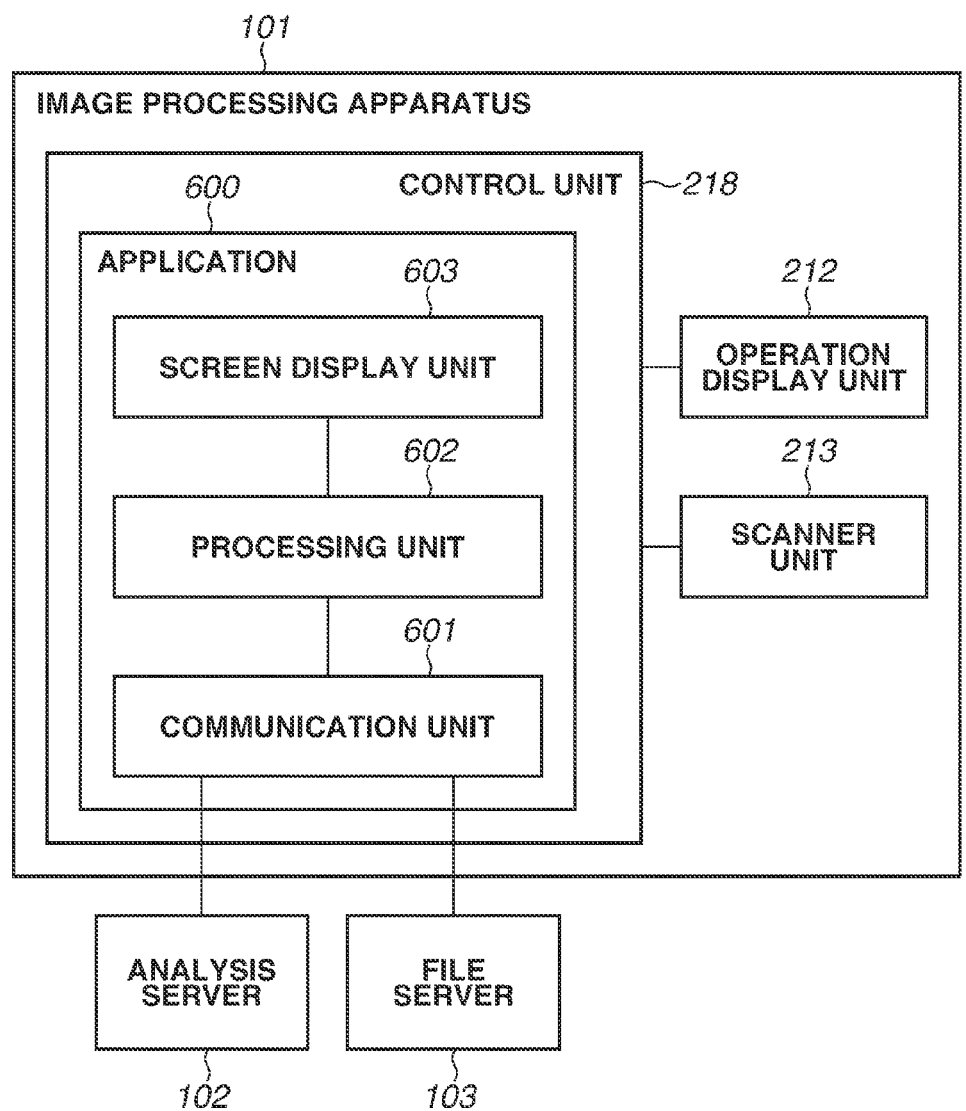
FIG. 6 illustrates an example of a software configuration of an application 600.

FIG. 6 illustrates an example of a software configuration of an application 600 to be executed by the image processing apparatus 101. The application 600 is stored in the ROM 221 and functions as each of function units (a communication unit 601, a processing unit 602, and a screen display unit 603) by being executed by the CPU 220 in the control unit 218 of the image processing apparatus.

The processing unit 602 communicates with the analysis server 102 and the file server 103 via the communication unit 601. Main processing of the processing unit 602 is to instruct the scanner unit 213 to execute scanning via the control unit 218 of the image processing apparatus 101. Further, the processing unit 602 transmits the image data obtained by scanning by the scanner unit 213 to the analysis server 102 and receives an analysis result as a response therefrom. Furthermore, the processing unit 602 transmits the image data file obtained by scanning by the scanner unit 213 and the storage destination of the image data file to the file server 103 and instructs the file server 103 to store the file. A series of processing sequences centered on the processing unit 602 is described below with reference to FIG. 9 (including FIGS. 9A and 9B).

The screen display unit 603 performs processing for displaying a screen to a user via the operation display unit 212. More specifically, the screen display unit 603 displays the operation screen and makes a request to the processing unit 602 for performing processing corresponding to a user operation.

Figure 7:
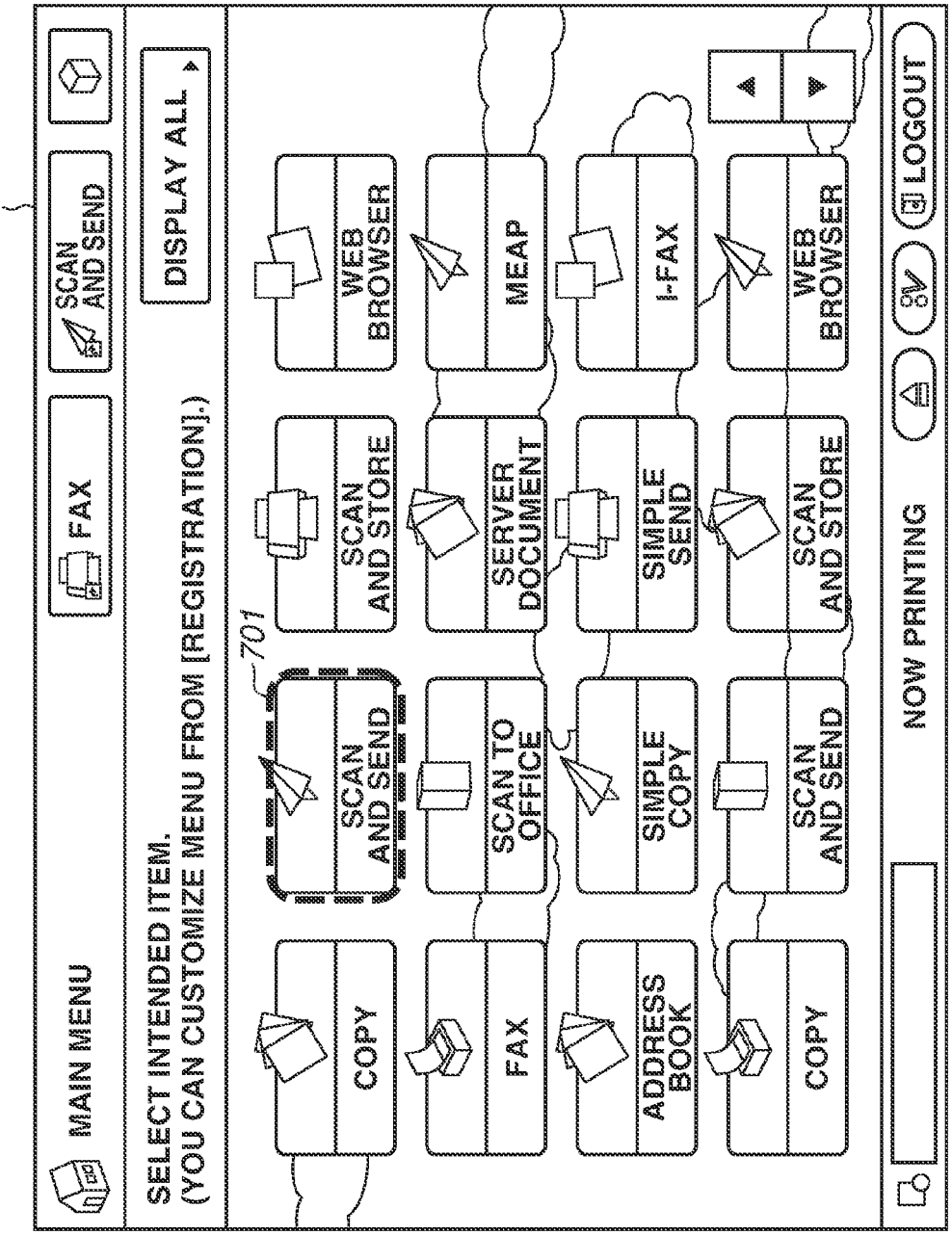
FIG. 7 illustrates an example of a main menu screen displayed by an operation display unit 212.

FIG. 7 illustrates an example of a screen displayed on the display by the operation display unit 212 of the image processing apparatus 101. On a main menu screen 700, buttons are displayed each of which is accessible to each function (each application) available in the image processing apparatus 101. When a user presses a button, an application corresponding to the pressed button is started up. A button 701 is used to start a "scan and send" application. The main menu screen is displayed when a main menu key (not illustrated) included in the image processing apparatus 101 is pressed.

FIG. 8 illustrates an example of a screen displayed by the operation display unit 212 of the image processing apparatus 101 according to the present exemplary embodiment, namely, a screen 800 displayed by the application 600 started up in response to pressing of the "scan and send" button 701 by a user. When a user sets a document on the scanner unit and presses a start key 801 on the screen 800, the image processing apparatus executes scanning of the set document and transmits the scanned image to the analysis server 102 and the file server 103.

FIG. 9 (including FIGS. 9A and 9B) is a sequence diagram illustrating processing from when a user uses the operation screen of the application 600 illustrated in FIG. 8 to scan a document to when the image data is stored in the file server 103.

In step S9001, when the image processing apparatus 101 detects that the main menu key (not illustrated) is pressed by a user, the operation display unit 212 displays the main menu screen 700 illustrated in FIG. 7 on the display. When it is detected that the button 701 for starting up the application 600 is pressed on the main menu screen 700, in step S9002, the operation display unit 212 notifies the application 600 that the application 600 is selected and starts the application 600. When receiving the notification, in step S9003, the application 600 transmits initial screen information thereof to the operation display unit 212 and instruct the operation display unit 212 to display the screen. In step S9004, the operation display unit 212 displays the received screen 800.

On the screen 800, scanning conditions (reading settings such as color/monochrome, one side reading/two sides reading, and the like) can be set based on a user instruction. When the start key 801 of the application 600 is pressed by a use in a state in which a document including a plurality of sheets is placed on the ADF of the scanner unit, in step S9005, the operation display unit 212 notifies the application 600 of pressing of the start key.

In response to the notification of pressing of the start button, in step S9006, the application 600 instructs the scanner unit 213 to execute scanning. In step S9007, the scanner unit 213 sequentially scans the document including the plurality of sheets and creates electronic data including image data pieces of a plurality of pages. When scanning of all of the plurality of sheets in the document is complete, in step S9008, the scanner unit 213 notifies the application 600 of completion of scanning. When receiving the scan completion notification, in step S9009, the application 600 instructs the transmission unit 215 to transmit the electronic data (the image data) created by the scanner unit 213 by dividing for each page. The transmission unit 215 which receives the instruction divides the electronic data created by the scanner unit 213 for each page and sequentially transmits the electronic data divided for each page to the analysis server 102.

When receiving a first page of the electronic data divided for each page, in step S9011, the analysis server 102 starts analysis processing of the electronic data in the order of reception. The analysis processing of data by the analysis server 102 is described in detail below with reference to FIG. 11. When determining that the storage destination candidates are determined while sequentially analyzing the pages, in step S9012, the analysis server 102 returns a response including the information of the storage destination candidates obtained as an analysis result.

In step S9013, the transmission unit 215 which receives the response from the analysis server 102 returns a response to the application 600 together with the analysis result (the information of the storage destination candidate). In step S9014, the application 600 instructs the transmission unit 215 to stop page division transmission. This is because the analysis result by the analysis server 102 is received as the response, and thus further transmission of data is not necessary. In step S9015, the transmission unit 215 returns a result of cancellation of a transmission job as a response.

In step S9016, the application 600 creates screen information for presenting the storage destination candidates for a user to select the storage destination of the electronic data based on the analysis result obtained in step S9013. In step S9017, the application 600 transmits a screen display instruction to the operation display unit 212 to display the created screen information. In step S9018, the operation display unit 212 displays the screen information for selecting the storage destination on the display. An example of the screen information including the analysis result (the information of the storage destination candidate) is described with reference to FIG. 10.

Figure 10:
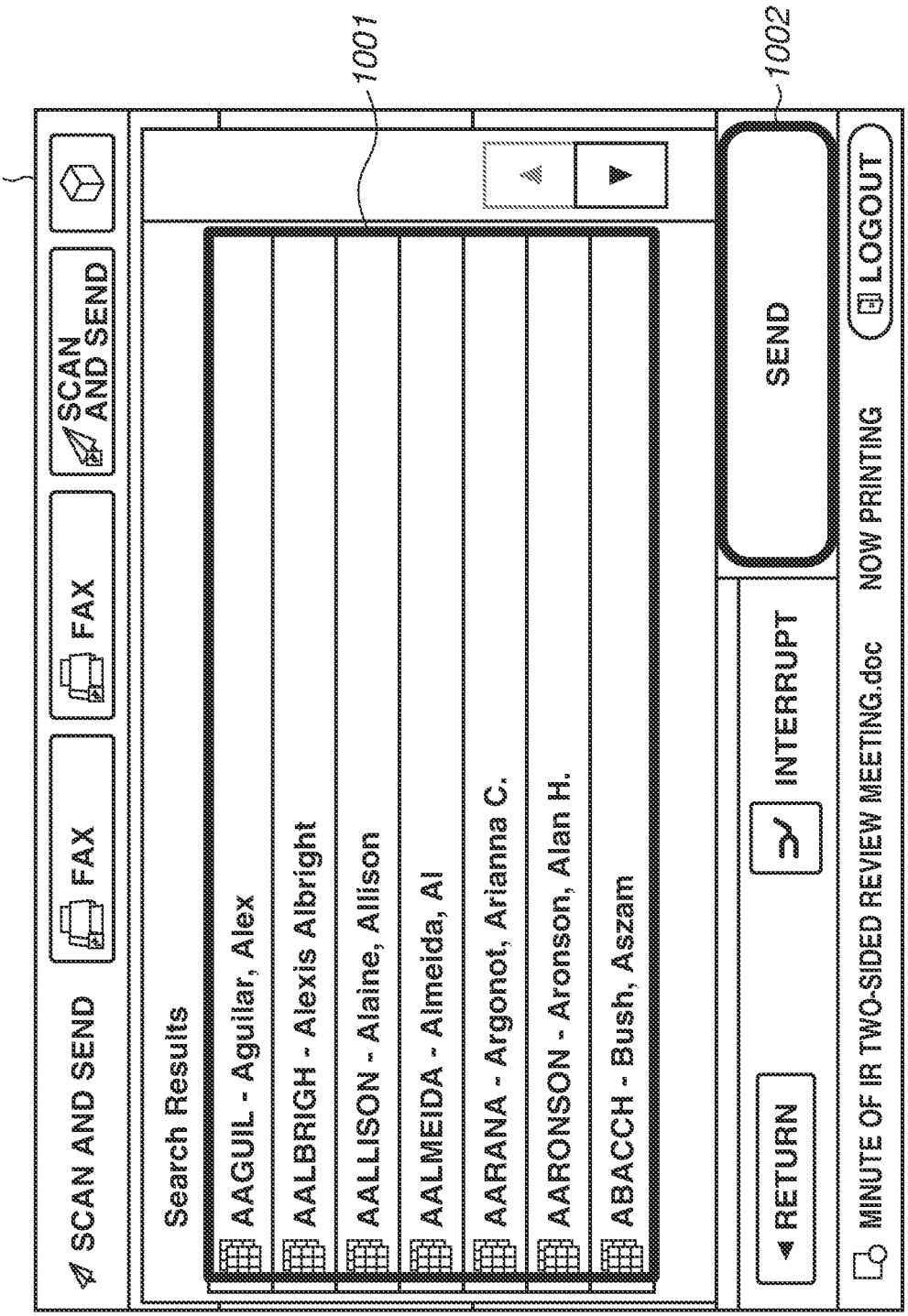
FIG. 10 illustrates an example of a screen for causing a user to select a storage destination from among storage destination candidates.

FIG. 10 is an example of a screen 1000 for causing a user to select the information of the storage destination candidate which is determined as appropriate for the storage destination of the scanned image data as a result of analysis by the analysis server 102. When a user selects a desired storage destination from among the storage destination candidates displayed on a storage destination candidate display portion 1001 and presses a transmission button 1002, the application 600 transmits the scanned data to the selected storage destination of the file server 103.

Returning to FIG. 9B, the sequence is described. When the storage destination is selected by a user operation and the transmission button is pressed, in step S9019, the operation display unit 212 notifies the application 600 of the selected storage destination and pressing of the transmission button. In step S9020, the application 600 which receives the notification instructs the transmission unit 215 to transmit a file. In this regard, the application 600 instructs transmission without dividing a file. In step S9021, the transmission unit 215 which receives the instruction transmits to the file server 103 the electronic data created by the scanner unit 213 as a single file without dividing into pages.

In step S9022, the file server which receives the file stores the data in a folder of the specified storage destination, and in step S9023, returns a response indicating completion of storage processing of the file. In step S9024, the transmission unit 215 returns a response of completion of storage processing to the application 600. In step S9025, the application 600 instructs the operation display unit 212 to display a transmission completion screen. In step S9026, the operation display unit 212 displays the completion screen, and the processing is terminated.

Figure 11:
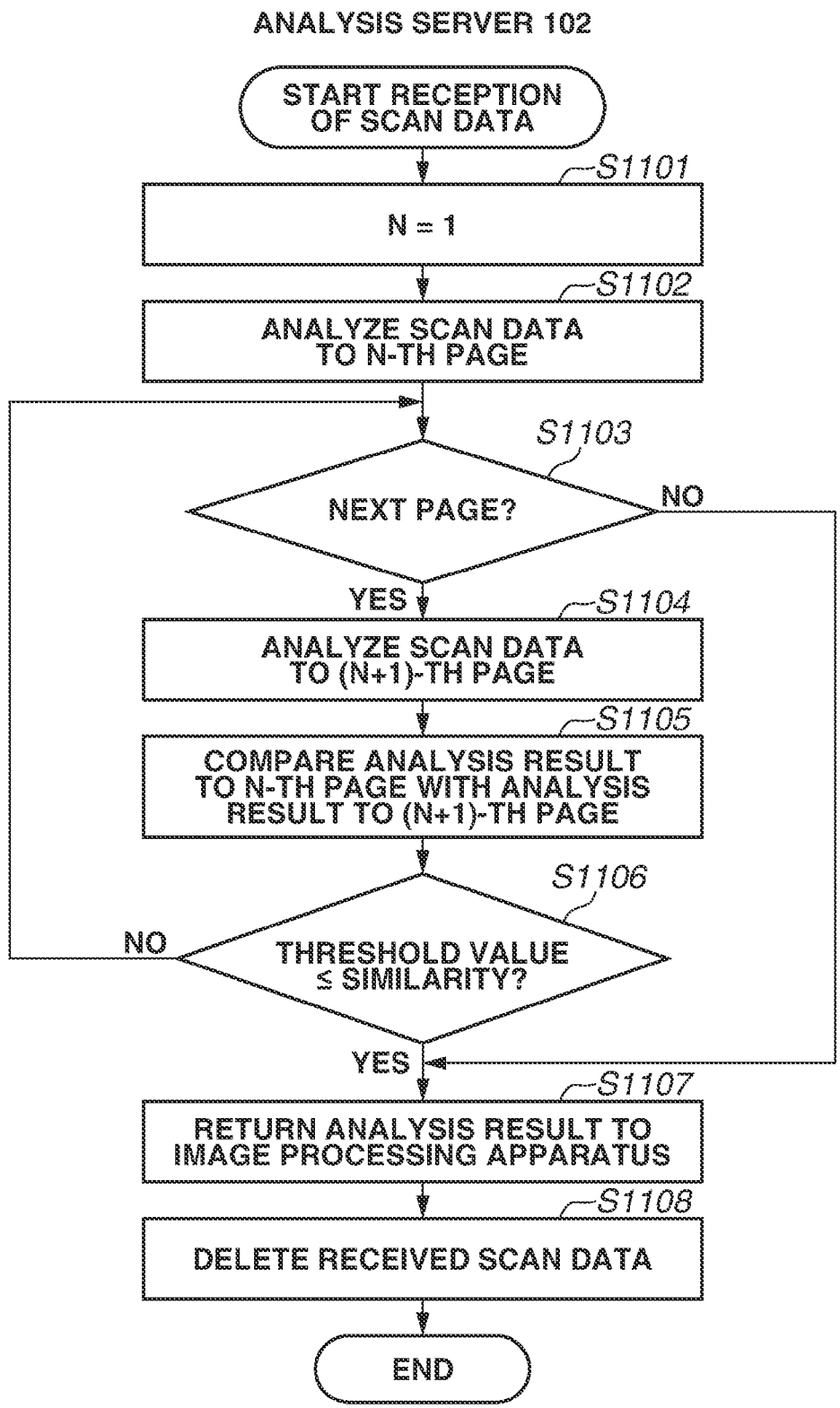
FIG. 11 is a flowchart illustrating analysis processing executed in the analysis server 102.

FIG. 11 is a flowchart illustrating processing that the analysis server 102 analyzes the electronic data received from the transmission unit 215 in step S9011 in FIG. 9B.

When starting reception of the electronic data divided for each page, in step S1101, the analysis server 102 initializes an internal variable N to 1. In step S1102, the analysis server 102 analyzes data up to an N-th page and determines the storage destination candidate based on the data up to the N-th page. In the case of N=1, namely, a first page, the first page is analyzed. As described above, the analysis processing is to extract text data by executing character recognition processing on the received page and compare file information (feature information obtained by analyzing a file stored in each storage destination in the file server) stored in advance in the file information DB unit 407 with the extracted text data to determine the storage destination candidate.

In step S1103, the analysis server 102 checks whether next page data is received. If it is determined that a next page is received (YES in step S1103), the processing proceeds to step S1104, and the analysis server 102 further analyzes data of the next page, i.e., a (N+1)-th page and determines the storage destination candidate based on the analyzed data (data from the first page to the (N+1)-th page). In step S1105, the analysis server 102 compares the analysis result (the storage destination candidate) an to the N-th page with the analysis result (the storage destination candidate) up to the (N+1)-th page newly analyzed in step S1104. In step S1106, the analysis server 102 determines whether a similarity between these two analysis results is equal to or greater than a predetermined threshold value by a comparison result in step S1105. When the similarity is equal to or greater than the predetermined threshold value (YES in step S1106), it is determined that the similarity is high (the storage destination candidate is determined), and the processing proceeds to step S1107. The analysis server 102 returns the analysis result up to the (N+1)-th page (namely, the information of the storage destination candidate) to the image processing apparatus. After returning the analysis result in step S1107, in step S1108, the analysis server 102 deletes the received electronic data and terminates the processing. When the similarity is less than the predetermined threshold value (NO in step S1106), it is determined that the similarity is low (the storage destination candidate is still possible to vary), and the processing returns to step S1103.

As described above, when starting reception of the scanned data, the analysis server starts analysis from the first page in order and returns the storage destination candidate when determining that the storage destination candidate is determined. In other words, the analysis server performs analysis of the document page-by-page, and thus the analysis server can return a response (reply) when determining that the storage destination candidate is determined (the storage destination candidate no longer varies) before receiving all pages of the scanned data. Therefore, a time period until the storage destination candidate appropriate for the document is presented to a user can be shortened.

According to the first exemplary embodiment, the application 600 transmits scanned data sequentially from the first page, an analysis result up to the N-th page is compared with an analysis result up to the (N+1)-th page, and the analysis result is returned when a similarity therebetween exceeds a predetermined threshold value. However, depending on composition of each page in a document, there may be a case that, for example, main pages representing features of the document are concentrated on 10th to 15th pages. In such a case, the application 600 may be configured to cause a user to specify that from which page to which page are the characteristic pages on the operation screen displayed by the operation display unit 212 and prioritizes transmission of the specified page.

Further, according to the first exemplary embodiment, it is determined whether the storage destination candidate is determined every time analysis of one page is performed, however, aspects of the present invention are not limited to this configuration, and the storage destination candidate may be determined every time a predetermined number of pages (for example, two pages) is analyzed.

Embodiments of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated. circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application. No. 2015-017891, filed Jan. 30, 2015, which is hereby incorporated by reference herein in its entirety.

What is claimed is:

1. A document analysis system comprising:
an image processing apparatus; and
an analysis server,
wherein the image processing apparatus comprises:
a first memory; and
a first processor in communication with the first memory, wherein the first processor performs:
dividing image data obtained by scanning a document into a plurality of divided images each of which corresponds to each page of the document;
sequentially transmitting the divided images to the analysis server;
receiving storage destination candidates from the analysis server, wherein the sequentially transmission of the divided images is stopped when receiving the storage destination candidates from the analysis server;
displaying the received storage destination candidates for a user to select one storage destination of the image data; and
transmitting the obtained image data as one file to the one storage destination selected from the storage destination candidates by the user so as to be stored therein, and
wherein the analysis server comprises:
a second memory; and
a second processor in communication with the second memory, wherein the second processor performs:
sequentially analyzing the divided images, that are sequentially received from the image processing apparatus, to determine the storage destination candidates; and
replying the storage destination candidates to the image processing apparatus when the storage destination candidates are determined before receiving all of the divided images.

2. The document analysis system according to claim 1, wherein the analysis server stores feature information of files obtained by analyzing the files stored in each storage destination in advance, and
wherein the storage destination candidates are determined by comparing an analysis result, that is obtained by the sequentially analyzing the divided images, with the stored feature information.

3. The document analysis system according to claim 1, wherein the sequentially transmission of the divided images prioritizes a transmission of divided image corresponding to a page specified by a user.

4. The document analysis system according to claim 1, wherein the sequentially analysis of the divided images determines whether the storage destination candidates are determined every time a predetermined number of the divided images is analyzed.

* * * * *